US012202021B2

(12) United States Patent
MacNeil et al.

(10) Patent No.: US 12,202,021 B2
(45) Date of Patent: Jan. 21, 2025

(54) FLOATING ROOF TANK SCARIFYING SYSTEM

(71) Applicant: Mac & Mac Hydrodemolition Inc., Surrey (CA)

(72) Inventors: Gerard J. MacNeil, Surrey (CA); Jesse MacNeil, Surrey (CA); Brett MacNeil, Surrey (CA); Gordon MacNeil, Surrey (CA); Vernon Bose, Surrey (CA)

(73) Assignee: Mac & Mac Hydrodemolition Inc., Surrey (CA)

( * ) Notice: Subject to any disclaimer, the term of this patent is extended or adjusted under 35 U.S.C. 154(b) by 277 days.

(21) Appl. No.: 17/966,672

(22) Filed: Oct. 14, 2022

(65) Prior Publication Data

US 2023/0039811 A1 Feb. 9, 2023

Related U.S. Application Data

(62) Division of application No. 16/917,407, filed on Jun. 30, 2020, now Pat. No. 11,504,752.

(30) Foreign Application Priority Data

Mar. 16, 2020 (CA) ................................ CA 3076040

(51) Int. Cl.
*B08B 9/08* (2006.01)
*B65D 88/34* (2006.01)

(52) U.S. Cl.
CPC ............ *B08B 9/0813* (2013.01); *B65D 88/34* (2013.01); *B08B 2209/08* (2013.01)

(58) Field of Classification Search
CPC ... B08B 9/0813; B08B 2209/08; B08B 3/024; A47L 1/02; E04G 23/002; B63B 59/10; B63B 2059/082; B60S 3/04; B65D 88/34
See application file for complete search history.

(56) References Cited

U.S. PATENT DOCUMENTS 3,581,441 A * 6/1971 Hulbert, Jr. ........... B05B 7/1477 451/76
2017/0157636 A1* 6/2017 Wright ................... F16M 11/24
2019/0320859 A1* 10/2019 Bofill .................... E04G 23/002

FOREIGN PATENT DOCUMENTS

EP 3385003 A1 * 10/2018

* cited by examiner

*Primary Examiner* — Spencer E. Bell
(74) *Attorney, Agent, or Firm* — Clements Bernard Walker; Richard A. Walker; Jennifer R. Knight

(57) ABSTRACT

A scarifying rig may be mounted on the surface of a floating roof to move about the perimeter of the roof. The rig comprises a trolley, one or more support rails fixed on the trolley, and a horizontal arm mounted on the support rails for controlled movement along the support rails. A vertical rail is attached substantially to the end of the horizontal arm for reciprocating vertical movement (up and down) about the end of the horizontal arm. A nozzle assembly is mounted to the vertical rail.

2 Claims, 7 Drawing Sheets

FIG. 8
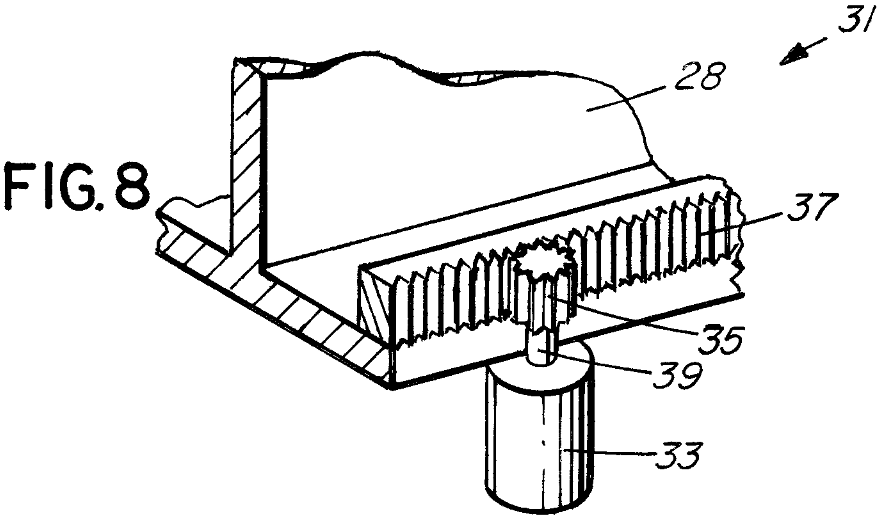
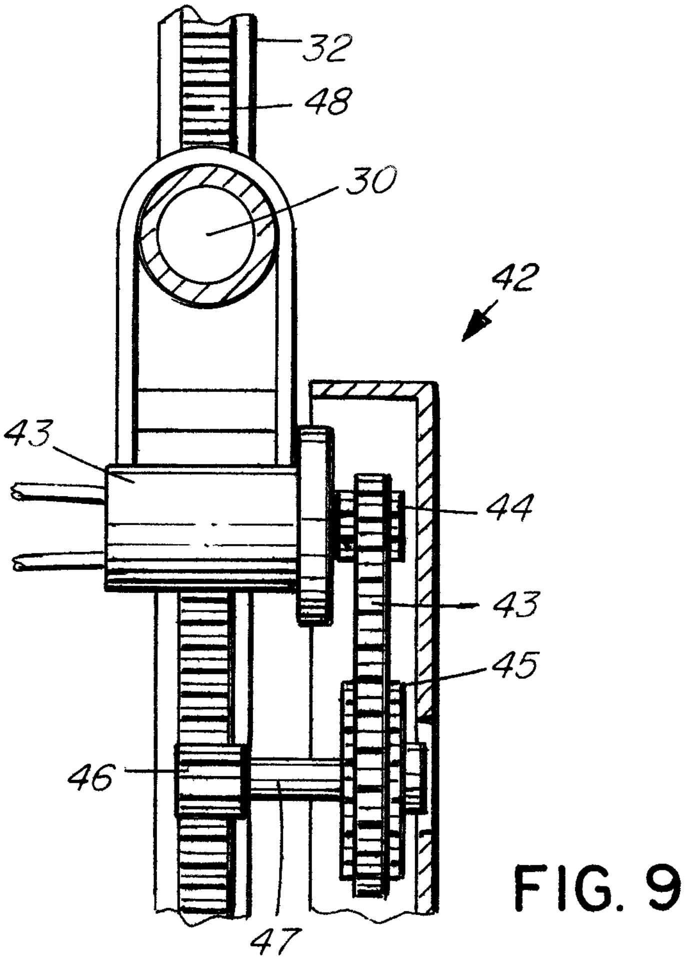
FIG. 9

FLOATING ROOF TANK SCARIFYING SYSTEM

CROSS-REFERENCE TO RELATED APPLICATIONS

This application is a Divisional of U.S. patent application Ser. No. 16/917,407, filed on Jun. 30, 2020; which claims the benefit of priority to Canadian Patent Application No. 3,076,040, filed Mar. 16, 2020, the aforementioned applications being hereby incorporated by reference in their respective entireties.

FIELD OF THE INVENTION

This invention relates to surface cleaning systems. In particular, this invention relates to a method and apparatus for cleaning vertical perimetral surfaces in a floating roof tank system.

BACKGROUND OF THE INVENTION

A floating roof tank is typically used to store large quantities of petroleum products such as crude oil or condensate. A roof floats on the surface of the stored liquid, and rises and falls with the liquid level inside the tank. Floating roof tanks are designed to avoid vapour space between the surface of petroleum products and the roof so as to reduce evaporation losses, contamination of the environment and the risk of fires. In some systems, the floating roof comprises two spaced decks with the space between the decks being sealed such that the roof acts as a large pontoon. In other systems, a series of pontoons are disposed around the perimeter of the roof. The gap between the outer rim of the roof (or the perimetral pontoons) and the tank shell is typically sealed by a rim seal.

Cleaning the sides of the rim or of the pontoons extending into the narrow gap in a floating roof tank is particularly challenging. The floating roof tank is very large, usually spanning more than 120 feet in diameter, and therefore cannot be removed to provide easy access to its side. The gap between the rim of the roof or the pontoons and the tank is in the order of 12-20 inches wide, thereby providing insufficient room to introduce scaffolding or other cleaning systems that would normally be used for vertical walls. The present invention provides a high-pressure water hydro-scarifying system that is particularly adapted and effective to overcome those limitations.

SUMMARY OF THE INVENTION

According to the invention, a mobile trolley is mounted on the surface of the roof in a floating roof tank system, more particularly about the roof perimeter. The trolley may be mounted on a perimeter rail system on the surface of the roof, but is preferably equipped with wheels to transit along the roof perimeter.

A frame on the trolley supports one or more elongated rails extending in the horizontal plane. The rails are preferably oriented to be substantially parallel to the nearest tangent of the tank shell or roof perimeter. The rails may also be curved to match the arc of the tank shell or the roof perimeter, but to work larger diameter tanks, the rails are preferably straight.

A preferably horizontal arm extends perpendicularly of the rails and is mounted for movement along them. A drive system acts to advance the arm a controllable distance along the rails. The drive system may be a rack and pinion mechanism wherein a motor drives a pinion gear that meshes with a rack gear mounted on the support rails such that the horizontal arm moves along the support rails. The drive system may be controlled by a microcontroller (operated by an operator) for controlled movement of the horizontal arm along the support rails.

A vertical rail depends from the end of the horizontal arm and is mounted to the arm so as to be translatable up and down along the end of the arm. A motor drive fixed on the arm may actuate vertical (up and down) movement of the vertical rail along the end of the arm, for example by actuating a gear on the horizontal arm that meshes with a gear on the vertical rail.

A nozzle assembly is fixed to the vertical rail to work the surface of the rim or tank shell. The disclosed arrangement allows for only a narrow vertical rail and a relatively narrow nozzle assembly to be introduced down the gap, while the trolley, the structure supporting the vertical rail and the drive actuating movement of the vertical rail are above the gap so as to be unencumbered by the small size of the gap.

Spaced limit stops are provided on the vertical rail and act to trigger reciprocation of the vertical movement when the limit stops are reached, through a suitable interface with the motor drive. A high-pressure water hose extends into the gap along the vertical rail to feed the nozzle assembly, which faces the surface to be worked. It will be appreciated that the hose is sufficiently long to track the movement of the vertical rail.

As the vertical rail reciprocates vertically, the surface is scarified along the path of the nozzle assembly.

The horizontal arm at the end of which the vertical rail is itself mounted for movement along the support rails on the trolley frame. Once a vertical swath of the surface has been worked by the up or down (or both) movement of the vertical rail, the horizontal arm is advanced a suitable distance along the rails to allow a new vertical swath to be worked by the nozzle assembly. Once the horizontal arm has reached the limit of its travel on the trolley frame, the entire trolley is advanced along the perimeter of the roof to iterate the process at the next adjacent area to be worked.

According to one aspect of the invention, an apparatus for cleaning the side of a floating roof in a floating roof tank system comprises: a mobile trolley having a frame; at least one support rail mounted on the frame, the support rail lying in the horizontal plane; an arm extending perpendicularly to the support rail, the arm lying in the horizontal plane and adapted to move along the support rail; a vertical rail mounted for up and down reciprocation about the end of the arm; and at least one high pressure water nozzle mounted on the vertical rail for delivering a jet of water parallel to the arm.

In another aspect, the vertical rail comprises at least two stop limits mounted on the vertical rail for triggering the vertical rail to change directions.

In a further aspect, a method of cleaning the side of a floating roof in a floating roof tank system comprises: providing the apparatus for cleaning the side of a floating roof in a floating roof tank system, installing the trolley of the apparatus about the perimetral edge of the floating roof such that the vertical rail lies in a space defined between the tank shell and the perimetral edge; operating a drive system to reciprocate the vertical rail up and down about the end of the arm while directing a jet of high-pressure water against the side of the floating roof to clean a first vertical swath of the side; and periodically indexing the arm along the support rail so as to position the vertical rail to clean a second vertical swath of the side.

In yet a further aspect, a method of cleaning the inner surface of a tank shell in a floating roof tank system comprises: providing the apparatus for cleaning the side of a floating roof in a floating roof tank system; installing the trolley of the apparatus about the perimetral edge of the floating roof such that the vertical rail lies in a space defined between the tank shell and the perimetral edge; operating a drive system to reciprocate the vertical rail up and down about the end of the arm while directing a jet of high-pressure water against the inner surface of the tank shell to clean a first vertical swath of the inner surface; and periodically indexing the arm along the support rail so as to position the vertical rail to clean a second vertical swath of the inner surface.

The foregoing may cover only some of the aspects of the invention. Other and sometimes more particular aspects of the invention will be appreciated by reference to the following description of at least one preferred mode for carrying out the invention in terms of one or more examples. The following mode(s) for carrying out the invention are not a definition of the invention itself, but are only example(s) that embody the inventive features of the invention.

BRIEF DESCRIPTION OF THE DRAWINGS

At least one mode for carrying out the invention in terms of one or more examples will be described by reference to the drawings thereof in which:

FIG. 8 is a magnified view of the first driver unit that actuates movement of the horizontal arm as shown in FIG. 7;

FIG. 9 is a magnified view of the second driver unit that actuates movement of the vertical rail as shown in FIGS. 5 and 6.

DETAILED DESCRIPTION OF AT LEAST ONE MODE FOR CARRYING OUT THE INVENTION IN TERMS OF EXAMPLE(S)

Figure 1:
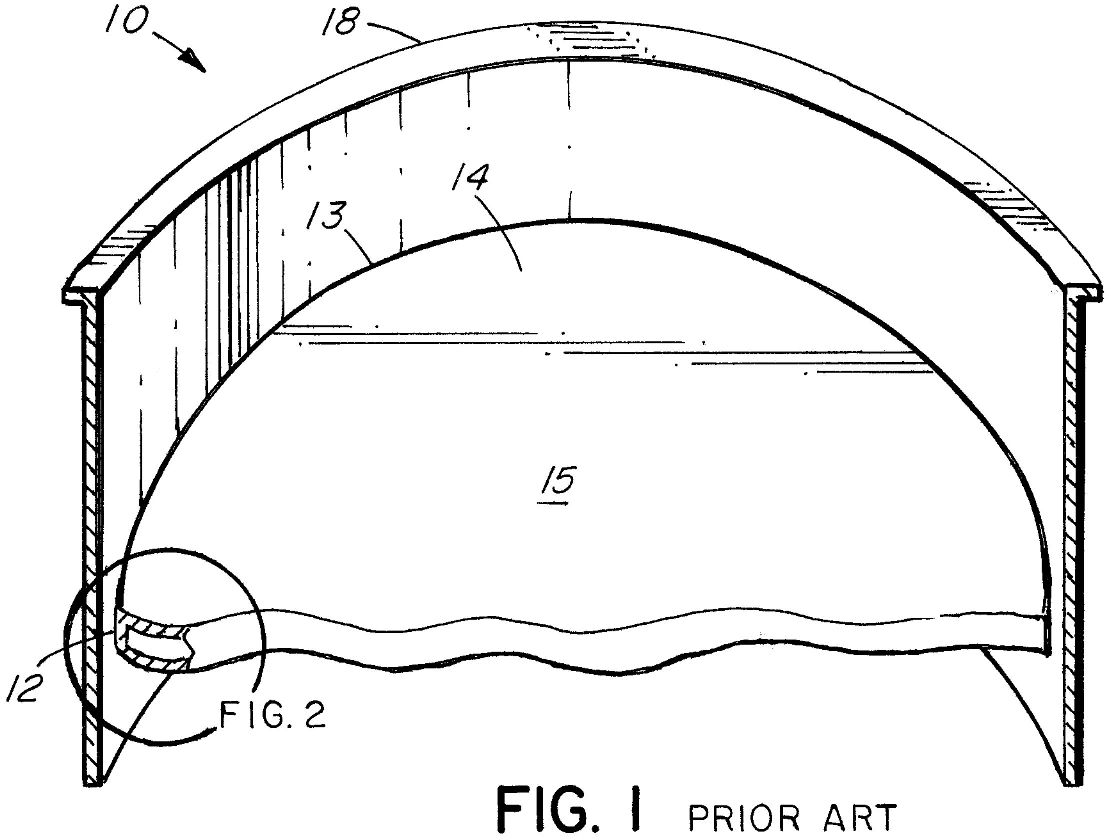
FIG. 1 PRIOR ART
FIG. 1 is a perspective partially sectioned view of a typical floating roof tank according to the prior art.
Figure 2:
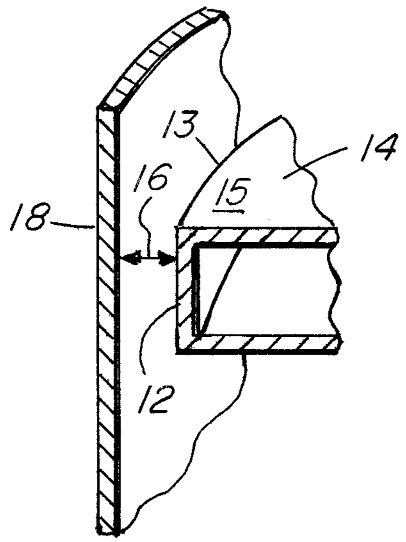
FIG. 2 PRIOR ART
FIG. 2 is a magnified sectional view of the floating roof tank of FIG. 1.

FIGS. 1 and 2 show a typical double deck or pontoon floating roof tank 10 according to the prior art. The floating roof tank 10 comprises a tank shell 18 and a floating roof 14. The floating roof 14 comprises a surface 15 and a side 12 extending downwardly from an edge 13 of the surface 15 to define a gap 16 between the side 12 of the roof 14 and the tank shell 18, as shown in FIG. 2. The width of the gap 16 is typically in the order of 12-20 inches.

Figure 3:
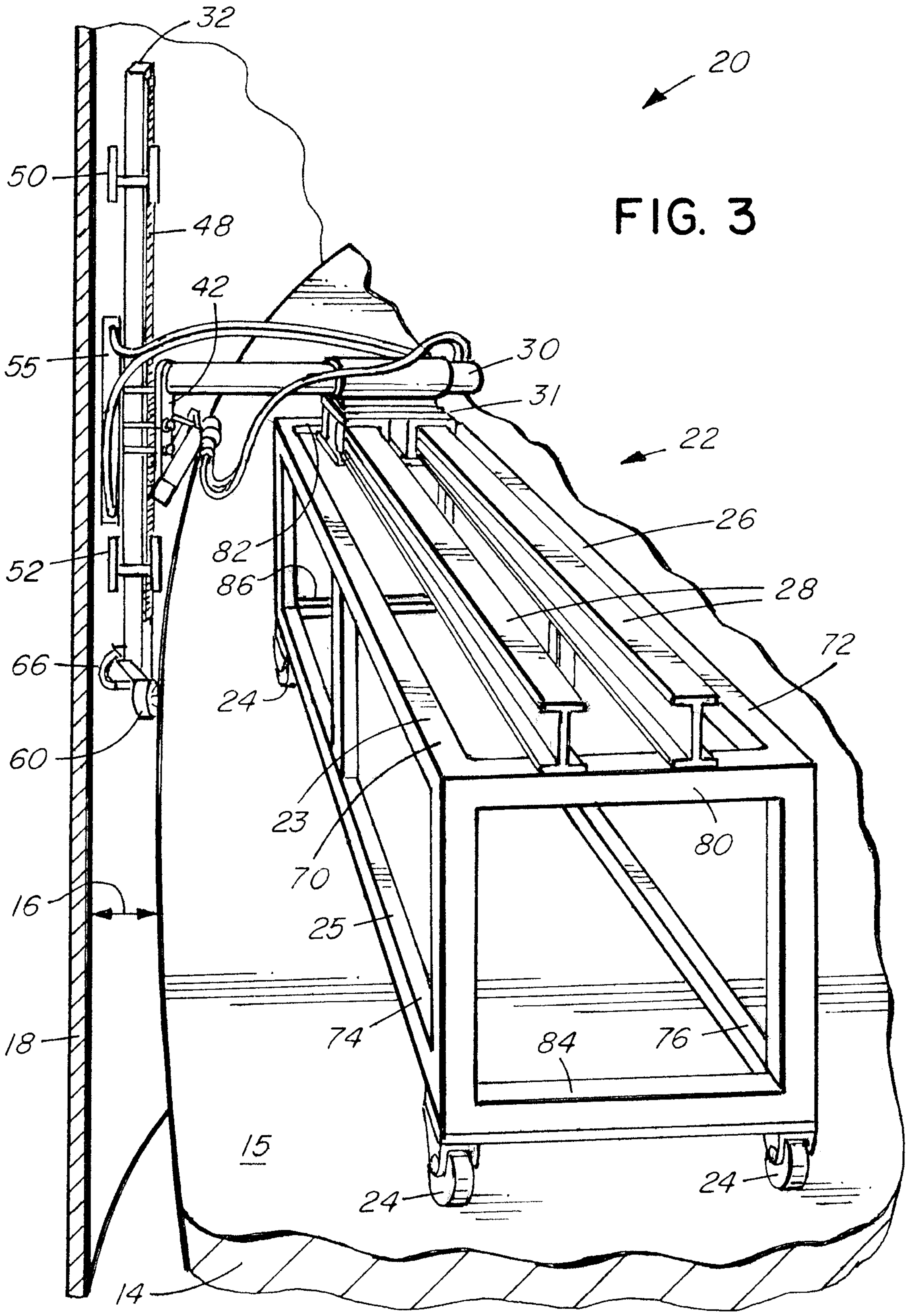
FIG. 3 is a perspective view of the preferred embodiment of the apparatus of invention.

FIG. 3 is a perspective view of the preferred embodiment of the invention. According to the preferred embodiment of the invention, a scarifying rig 20 may be positioned on the surface 15 of the floating roof 14 to move about the perimeter of the roof 14. The particular configuration of the rig 20 allows a vertical rail 32 to extend down into the gap 16 to clean the side 12 of the roof 14 using a high-pressure water nozzle 60 mounted at an end of the vertical rail 32. The nozzle orientation on the vertical rail 32 may be reversed to enable the rig 20 to work the inner surface of the tank shell 18 or a two-sided nozzle assembly (not shown) may work the inside surface of the tank shell 18 and the side 12 of the roof 14 at the same time.

The rig 20 comprises a trolley 22 having a frame 26 preferably mounted on wheels 24 for moving the trolley 22 about the perimeter of the roof 14. Alternatively, the frame 26 may be mounted on a perimeter rail system (not shown) fixed on the surface 15 of the roof 14. The rail system may comprise a pair of guides and rollers that travel along the edge 13 of the roof 14 to maintain a consistent distance between the trolley 22 and the edge 13 of the roof 14.

One or more support rails 28 are fixed on the frame 26. An arm 30 lying in the horizontal plane is mounted on the support rails 28 for controlled movement along the support rails 28, and a vertical rail 32 is mounted substantially at the end of the horizontal arm 30 for vertical movement (up and down) along the end of the horizontal arm 30.

Figure 4:
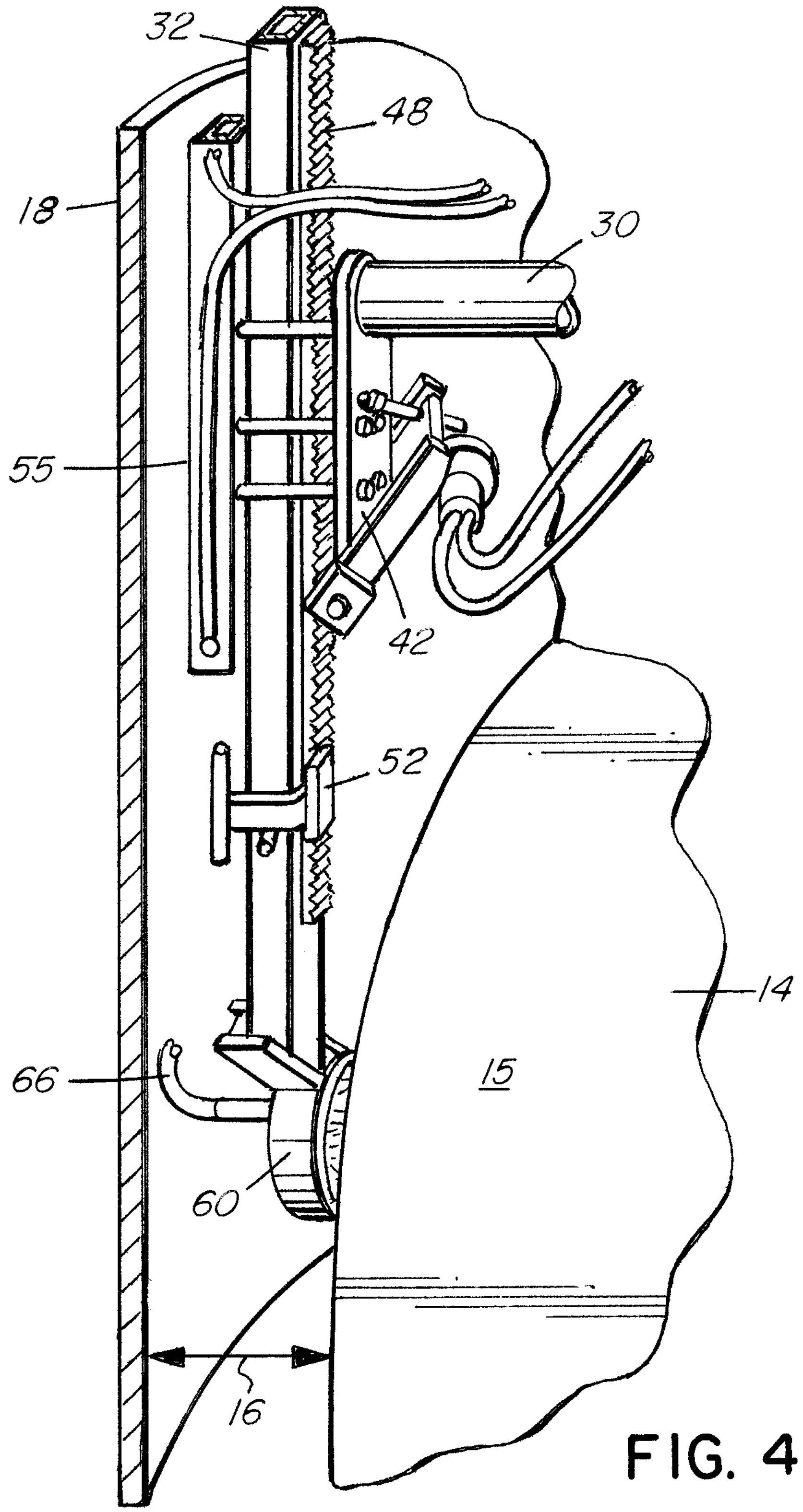
FIG. 4 is a magnified front elevation view of the vertical rail of the apparatus of FIG. 3.

FIG. 4 is an enlarged view of the vertical rail 32. The vertical rail 32 comprises a nozzle assembly 60 fixed to the lower end of the vertical rail 32 for delivering a jet of high-pressure water 64 parallel to the horizontal arm 30, towards the side 12 of the floating roof 14. While not fully shown, the high-pressure water 64 is preferably supplied by a supply hose 66 attached to the nozzle assembly 60. The vertical rail 32 and nozzle assembly 60 are narrow enough to extend into the narrow gap 16 between the side 12 of the floating roof 14 and the tank shell 18. The vertical rail 32 and nozzle assembly 60 are less than 30 inches wide and may be less than 20 inches wide, and are preferably less than 12 inches wide.

Although not shown, the nozzle assembly 60 may be reversed or rotated about the vertical rail 32 to spray high-pressure water 64 towards portions of the inner surface of the tank shell 18 that also extend into the gap 16. Alternatively, a two-sided nozzle assembly (not shown) may be fixed to the lower end of the vertical rail 32 for spraying high-pressure water 64 against the side 12 of the roof 14 and the inner surface of the tank shell 18 at the same time.

Referring to FIG. 3, the trolley 22 may be rectangular in shape. The frame 26 of the trolley 22 comprises an upper frame 23 and a lower frame 25 lying in the horizontal plane. The upper frame 23 comprises a pair of spaced upper side members 70, 72 and a pair of upper end members 80, 82 extending between the upper side members 70, 72 at the ends thereof to form a substantially rectangular-shaped upper frame 23.

Similarly, the lower frame 25 comprises a pair of spaced lower side members 74, 76 and a pair of lower end members 84, 86 extending between the lower side members 74, 76 at the ends thereof to form a substantially rectangular-shaped lower frame 25.

The wheels 24 (at least four of them) are preferably mounted on the periphery of the lower frame 25, such as at the corners thereof.

The support rails 28 are fixed on the upper frame 23 of the trolley 22 to extend in the horizontal plane. The support rails 28 may be fixed to the upper end members 80, 82 of the upper frame 23. The support rails 28 are preferably oriented to be substantially parallel to the nearest tangent of the tank shell 18 or perimeter of the floating roof 14. Alternatively, the support rails 28 may be somewhat curved to match the curvature of the tank shell 18 or the circumference of the roof 14.

Figure 7:
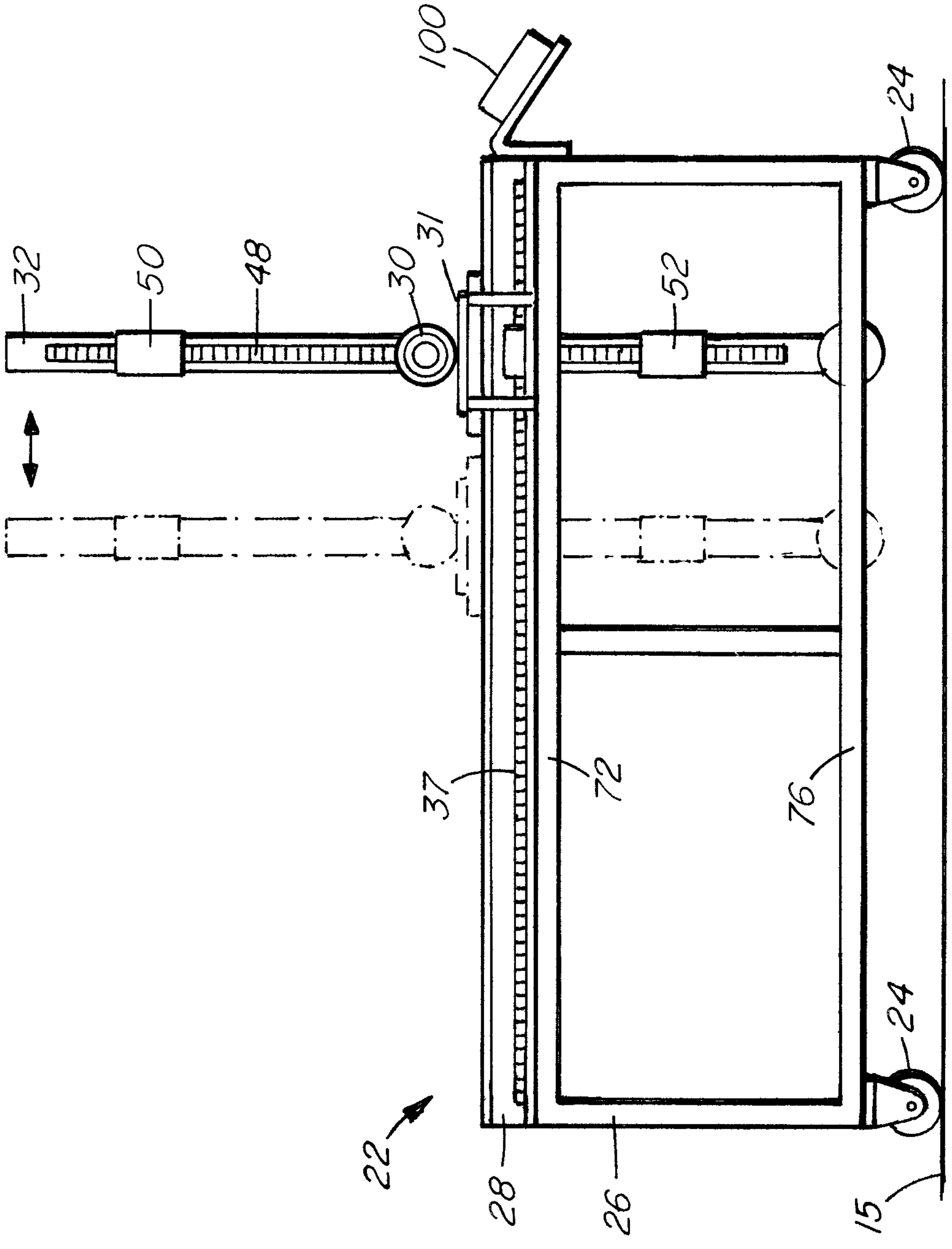
FIG. 7 is front elevation view of the apparatus of FIG. 3 showing movement of the horizontal arm (and in turn, the vertical rail) along the support rails.

The horizontal arm 30 is preferably mounted on the support rails 28 by way of a first driver unit 31 for controlled movement of the horizontal arm 30 along the support rails 28, as show in FIG. 7. The horizontal arm 30 is oriented substantially perpendicular to the support rails 28.

Referring to FIG. 8, the first driver unit 31 may comprise a rack and pinion type mechanism to actuate movement of the horizontal arm 30 along the support rails 28. The first driver unit 31 may comprise a first driver motor 33 that rotates a first driver pinon gear 35 formed along a first driver pinion shaft 39 mounted to the first drive motor 33. The first driver pinion gear 35 engages a first driver rack gear 37 mounted on the support rails 28 and travels along the first driver rack gear 37 such that the horizontal arm 30 moves along the support rails 28.

The first driver unit 31 is preferably connected to a microcontroller 100 to index the horizontal arm 30 a predetermined distance along the support rails 28 as set by an operator. Such indexing may occur periodically and/or automatically as vertical swaths of the surface being cleaned (i.e. the side 12 of the floating roof 14 or portions of the inner surface of the tank shell 18 that extend into the gap 16 between the side 12 of the roof 14 and the tank shell 18) are scarified by the nozzle assembly 60.

Figure 5:
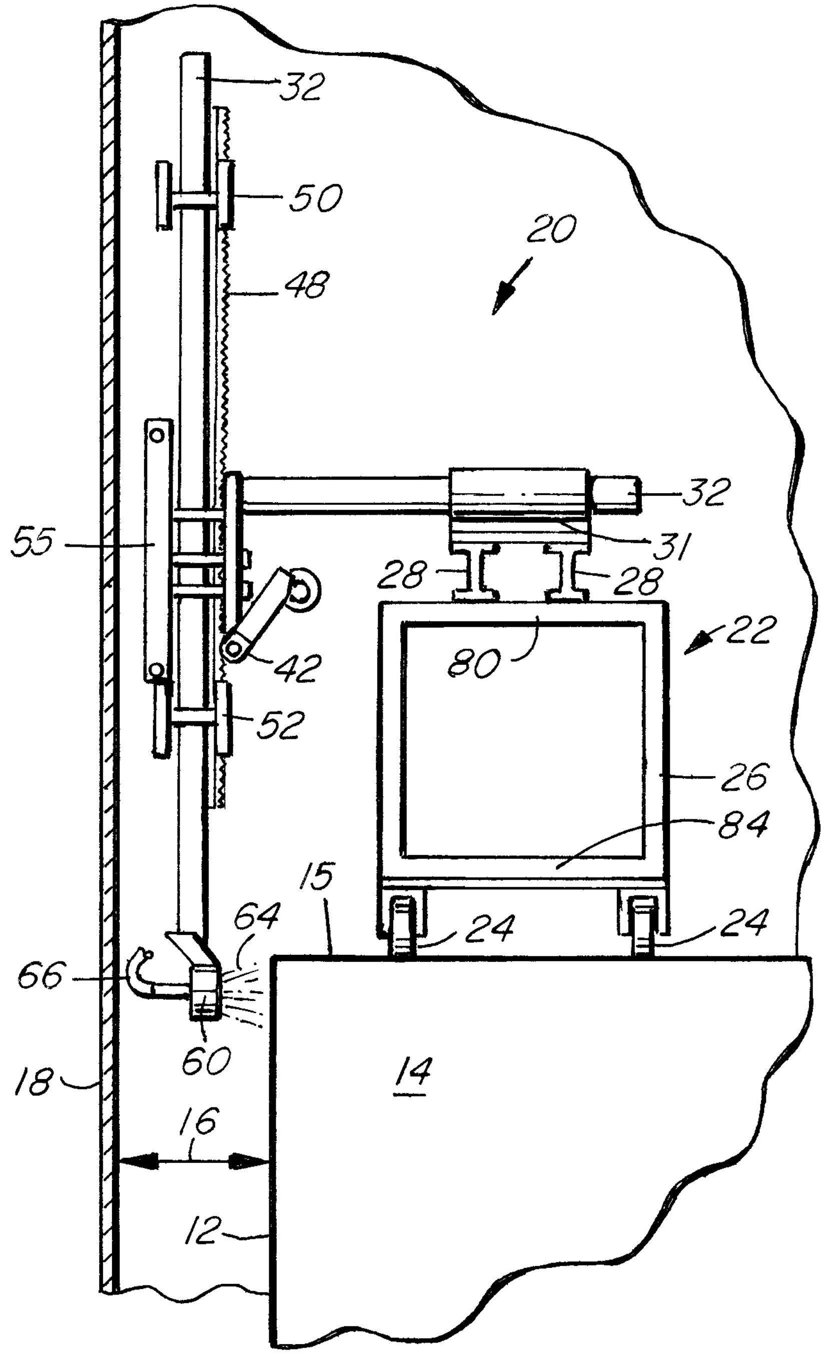
FIGS. 5 and 6 are side elevation views of the apparatus of FIG. 3 showing vertical movement (up and down) of the vertical rail along the end of the horizontal arm.
Figure 6:
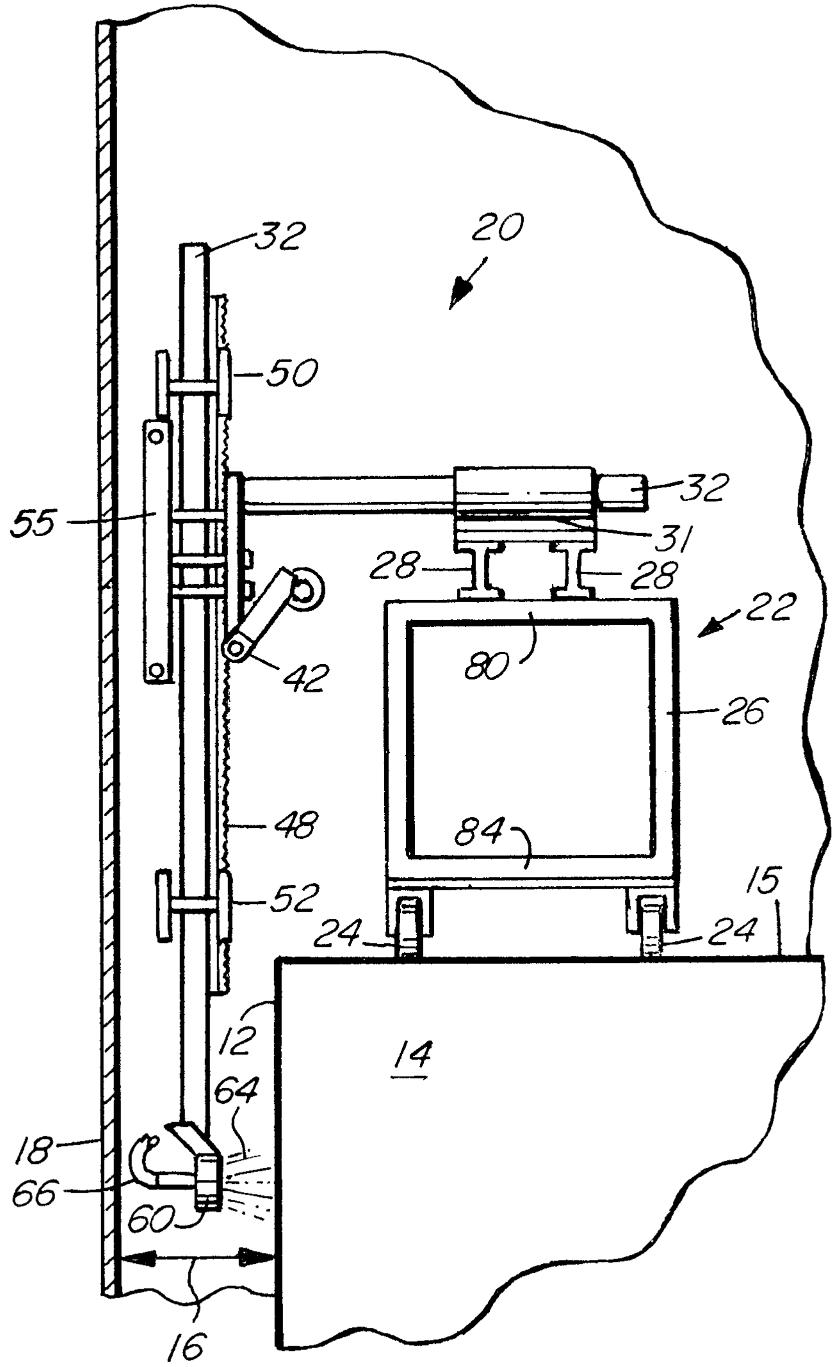

Referring to FIGS. 5 and 6, the vertical rail 32 is mounted substantially at the end of the horizontal arm 30. A second driver unit 42 actuates vertical movement (up and down) along the end of the horizontal arm 30. Referring to FIG. 4, the second driver unit 42 is fixed at the end of the horizontal arm 30 and actuates vertical movement (up and down) of the vertical rail 32.

FIG. 9 is an enlarged view of the second driver unit 42. The second driver unit 42 may comprise a chain and sprocket type mechanism and/or a rack and pinion type mechanism. The second driver unit 42 may comprise a second driver motor 43 that rotates a second driver gear 44 which engages a roller chain 43. The roller chain 43 engages a sprocket gear 45 which rotates a second driver pinion gear 46 formed along a second driver pinion shaft 47 mounted on the sprocket gear 45. Preferably, the second driver gear 44 meshes with the roller chain 43 on one end of the roller chain 43, and the sprocket gear 45 meshes with the roller chain 43 on another end of the roller chain 43. The second driver pinion gear 46 engages a second driver rack gear 48 mounted on the vertical rail 32 and travels along the second driver rack gear 48 such that the vertical rail 32 translates up and down along the end of the horizontal arm 32.

Referring to FIGS. 5 and 6, the vertical rail 32 further comprises a pair of stop limits 50, 52 that are set by an operator along the vertical rail 32. When the stop limits 50, 52 reach a stop limit interface 55 of the second driver unit 42, the direction of the second driver motor 43 is toggled to reverse directions such that the vertical rail 32 changes direction.

The present invention further provides a method for cleaning the side 12 of the floating roof 14, comprising: 1) providing the scarifying/cleaning rig 20; 2) installing the trolley 22 of the rig 20 about the perimeter of the roof 14 such that the vertical rail 32 lies in the gap 16 between the tank shell 18 and the edge 13 or side 12 of the roof 14; 3) operating a drive system (i.e. the second driver unit 42) to reciprocate the vertical rail 32 up and down about the end of the horizontal arm 30 while directing a jet of high-pressure water 64 against the side 12 of the roof 14 to clean a vertical swath thereof; and 4) periodically indexing the horizontal arm 30 along the support rails 28 so as to position the vertical arm 32 to clean a new vertical swath of the side 12 of the roof 14.

As the vertical rail 32 reciprocates up and down, the nozzle assembly 60 attached to the lower end of the vertical rail 32 cleans a vertical swatch of the side 12 of the roof 14. Once a vertical swatch of the side 12 of the roof 14 has been cleaned, the horizontal arm 30 is advanced a distance along the support rails 28 to allow a new vertical swatch of the side 12 of the roof 14 to be cleaned by the nozzle assembly 60. Once the horizontal arm 30 has reached the limits of its travel along the support rails 28, the trolley 22 may be wheeled along the perimeter of the floating roof 14 to repeat the scarifying/cleaning process with an adjacent area of the side 12 of the roof 14.

The method may be adapted for cleaning portions of the inner surface of the tank shell 18 that extend into the gap 16 between the tank shell 18 and the edge 13 or side 12 of the roof 14. The nozzle assembly 60 may be reversed or rotated (not shown) about the lower end of the vertical rail 32 to direct a jet of high-pressure water 64 against the inner surface of the tank shell 18 to clean a vertical swatch thereof.

The method may also be adapted for cleaning the side 12 of the roof 14 and portions of the inner surface of the tank shell 18 that extend into the gap 16 at the same time. The nozzle assembly 60 may be a two-sided nozzle (not shown) for directing jets of high-pressure water 64 against the side 12 of the roof 14 and the inner surface of the tank shell 18 at the same time to clean vertical swatches thereof simultaneously.

Furthermore, the vertical rail 32 may be rotated about the end of the horizontal arm 30 and preferably oriented in the horizontal plane when the rig 20 is not in use for ease of transport and storage.

In the foregoing description, exemplary modes for carrying out the invention in terms of examples have been described. However, the scope of the claims should not be limited by those examples, but should be given the broadest interpretation consistent with the description as a whole. The specification and drawings are, accordingly, to be regarded in an illustrative rather than a restrictive sense.

What is claimed is:

1. An apparatus for cleaning a side of a floating roof in a floating roof tank system comprising:

a mobile trolley having a frame;

at least one support rail mounted on said frame, said support rail lying in a horizontal plane;

an arm extending perpendicularly from said support rail, said arm lying in said horizontal plane, said arm adapted to move horizontally along said support rail;

a vertical rail mounted for up and down reciprocation about an end of said arm; and at least one water nozzle mounted on said vertical rail for delivering a jet of water parallel to said arm.

2. The apparatus in claim 1, wherein said vertical rail comprises at least two stop limits mounted on said vertical rail for triggering said vertical rail to change directions.

* * * * *